US011410118B2

(12) United States Patent
Fee et al.

(10) Patent No.: US 11,410,118 B2
(45) Date of Patent: Aug. 9, 2022

(54) PACKAGE MANAGEMENT SYSTEM

(71) Applicant: Florence Corporation, Manhattan, KS (US)

(72) Inventors: Kevin A. Fee, Manhattan, KS (US); Michael R. Molt, Manhattan, KS (US); Dennis Brox, Manhattan, KS (US); Maroof Choudhury, Pembroke Pines, FL (US); Lowell Scott, Manhattan, KS (US)

(73) Assignee: Florence Corporation, Manhattan, KS (US)

( * ) Notice: Subject to any disclaimer, the term of this patent is extended or adjusted under 35 U.S.C. 154(b) by 683 days.

(21) Appl. No.: 16/427,715

(22) Filed: May 31, 2019

(65) Prior Publication Data

US 2019/0370744 A1    Dec. 5, 2019

Related U.S. Application Data

(60) Provisional application No. 62/679,273, filed on Jun. 1, 2018.

(51) Int. Cl.
| | |
|---|---|
| *G06Q 10/08* | (2012.01) |
| *G07C 9/00* | (2020.01) |
| *E05B 47/00* | (2006.01) |
| *E05B 65/02* | (2006.01) |
| *G07C 9/38* | (2020.01) |

(Continued)

(52) U.S. Cl.
CPC ..... *G06Q 10/0836* (2013.01); *E05B 47/0001* (2013.01); *E05B 65/025* (2013.01); *G06Q 10/087* (2013.01); *G06Q 10/0834* (2013.01); *G07C 9/00896* (2013.01); *G07C 9/38* (2020.01); *G07F 17/13* (2020.05); *A47G 29/141* (2013.01); *A47G 2029/146* (2013.01); *G07C 9/00944* (2013.01); *G07C 2009/0092* (2013.01)

(58) Field of Classification Search
None
See application file for complete search history.

(56) References Cited

U.S. PATENT DOCUMENTS

| | | |
|---|---|---|
| 5,385,265 A | 1/1995 | Schlamp |
| 6,456,981 B1 | 9/2002 | Dejaeger et al. |

(Continued)

FOREIGN PATENT DOCUMENTS

WO    WO 2017/163018 A2    9/2017

*Primary Examiner* — K. Wong
(74) *Attorney, Agent, or Firm* — Leydig, Voit & Mayer, Ltd.

(57) ABSTRACT

A system for securely delivering packages of at least two different sizes by a sender to a receiver is disclosed comprising, installing an array of lockers of at least two different sizes with the number of lockers of each size based on a predetermined installed ratio, a central control unit for controlling the locking portions on the array of lockers having a locker optimization unit adapted to use data collected on the frequency of use of each size of lockers to recommend a ratio of lockers of each size to maximize usage of lockers of appropriate size in the array, wherein if the recommended ratio is different from the installed ratio, changing the sizes of selected lockers after installation of the array to better match the recommended ratio by replacing doors without removing hinge pins and moving and re-fastening the top and bottom walls of the lockers.

16 Claims, 13 Drawing Sheets

(51) Int. Cl.
  *G07F 17/12* (2006.01)
  *A47G 29/14* (2006.01)

(56) References Cited

U.S. PATENT DOCUMENTS

| | | | |
|---|---|---|---|
| 7,099,038 | B2 | 8/2006 | Schuller |
| 8,589,310 | B2 | 11/2013 | Mayer et al. |
| 9,082,247 | B2 | 7/2015 | Turner et al. |
| 9,223,315 | B2 | 12/2015 | Irwin et al. |
| 9,547,962 | B2 | 1/2017 | Motoyama |
| 9,604,258 | B2 | 3/2017 | Layne et al. |
| 9,604,259 | B2 | 3/2017 | Lossov et al. |
| 9,715,780 | B2 | 7/2017 | Garrison |
| D864,515 | S | 10/2019 | Hirvesaar |
| D881,503 | S | 4/2020 | Hirvesaar |
| 10,621,811 | B2 | 4/2020 | Tovey et al. |
| 11,270,251 | B2 * | 3/2022 | Fee .................. G06Q 30/04 |
| 2002/0035515 | A1 | 3/2002 | Moreno |
| 2002/0054370 | A1 | 5/2002 | Hara |
| 2002/0130172 | A1 | 9/2002 | Hara |
| 2002/0177922 | A1 | 11/2002 | Bloom |
| 2003/0025590 | A1 | 2/2003 | Gokcebay et al. |
| 2003/0195696 | A1 | 10/2003 | Jones |
| 2007/0296579 | A1 | 12/2007 | Mayer et al. |
| 2008/0082257 | A1 | 4/2008 | Lee |
| 2010/0057580 | A1 | 3/2010 | Raghunathan |
| 2010/0197293 | A1 | 8/2010 | Shem-Tov |
| 2010/0203831 | A1 | 8/2010 | Muth |
| 2011/0125664 | A1 | 5/2011 | Kadaba |
| 2011/0144798 | A1 | 6/2011 | Freudelsperger |
| 2012/0130916 | A1 | 5/2012 | Neal et al. |
| 2012/0194043 | A1 | 8/2012 | Turner et al. |
| 2012/0306617 | A1 | 12/2012 | Tung |
| 2013/0144428 | A1 | 6/2013 | Irwin et al. |
| 2013/0159194 | A1 | 6/2013 | Habib |
| 2013/0198101 | A1 | 8/2013 | Beckerle et al. |
| 2013/0261792 | A1 | 10/2013 | Gupta et al. |
| 2013/0286046 | A1 | 10/2013 | Rodriguez |
| 2013/0307382 | A1 | 11/2013 | Garrison |
| 2013/0337890 | A1 | 12/2013 | Earley et al. |
| 2013/0338822 | A1 | 12/2013 | Gibson, Jr. et al. |
| 2014/0114875 | A1 | 4/2014 | Murthy et al. |
| 2014/0120901 | A1 | 5/2014 | Ward et al. |
| 2014/0279666 | A1 | 9/2014 | Lievens et al. |
| 2014/0316916 | A1 | 10/2014 | Hay |
| 2014/0330603 | A1 | 11/2014 | Corder et al. |
| 2014/0373184 | A1 | 12/2014 | Mahaffey et al. |
| 2015/0081583 | A1 | 3/2015 | Butler et al. |
| 2015/0091693 | A1 | 4/2015 | Bibeau et al. |
| 2015/0120601 | A1 | 4/2015 | Fee |
| 2015/0133051 | A1 | 5/2015 | Jamal-Syed et al. |
| 2015/0186840 | A1 | 7/2015 | Torres et al. |
| 2015/0356801 | A1 | 12/2015 | Nitu et al. |
| 2016/0106291 | A1 | 4/2016 | Eun |
| 2018/0033235 | A1 | 2/2018 | Dotterweich et al. |
| 2018/0182189 | A1 | 6/2018 | Lakshmi-Ratan et al. |
| 2019/0114585 | A1 | 4/2019 | Fee et al. |
| 2019/0114859 | A1 | 4/2019 | Fee et al. |
| 2020/0066086 | A1 | 2/2020 | Fee et al. |

* cited by examiner

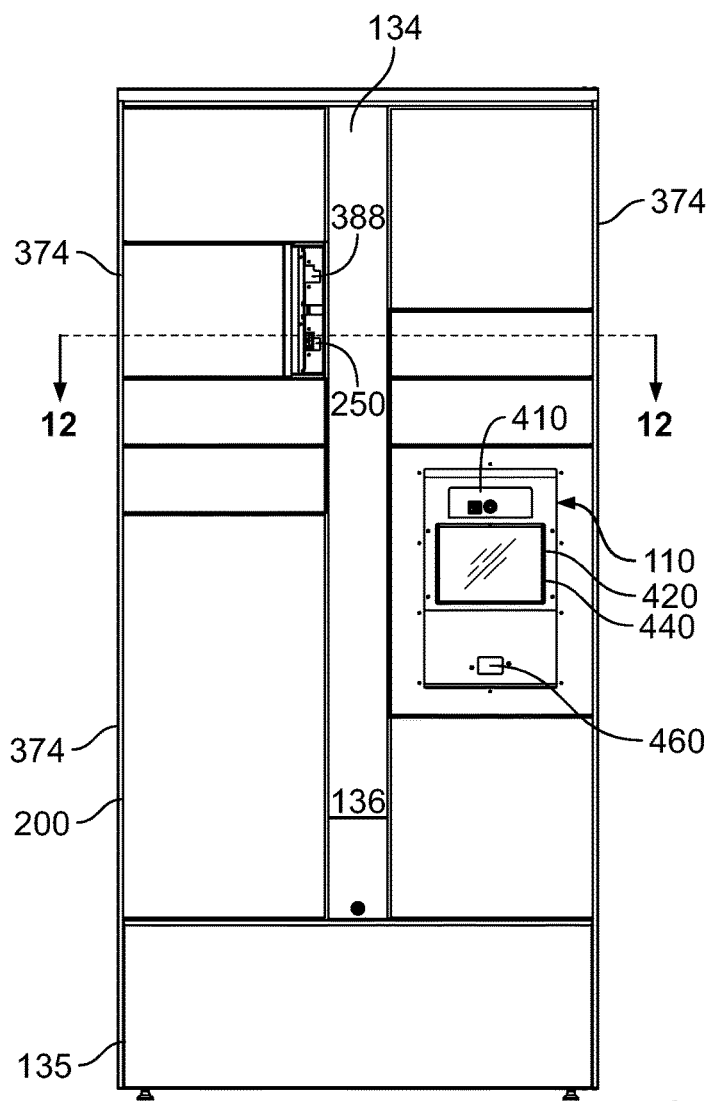
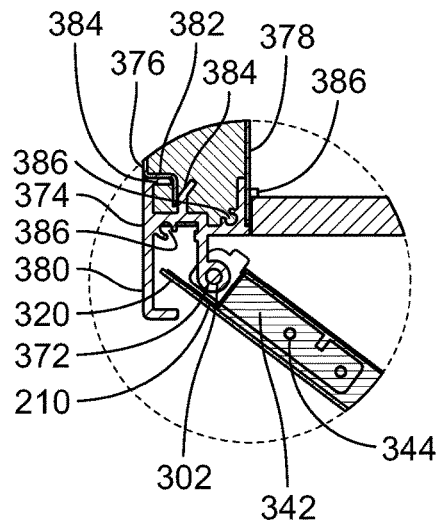
FIG. 13
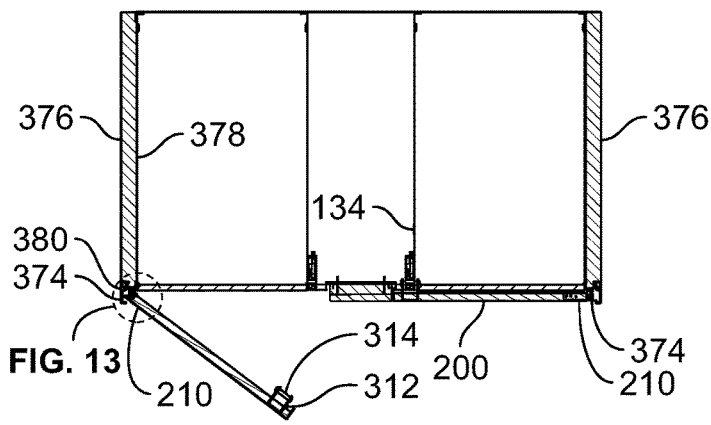
FIG. 12

PACKAGE MANAGEMENT SYSTEM

CROSS-REFERENCE TO RELATED APPLICATIONS

This patent application claims the benefit of U.S. Provisional Patent Application No. 62/679,273, filed Jun. 1, 2018, which is incorporated herein by reference in its entirety.

TECHNICAL FIELD

The present disclosure relates to a system for managing packages and other items that provides efficiencies for users of the system.

BACKGROUND

Consumers are increasingly embracing online shopping and are spending increasing amounts with online retailers. With the increased use and confidence of online retailing, not only is the frequency of packages being delivered increasing, but also the value and size of products purchased is increasing. Some online retailers have used increasing economies of scale to help reduce the costs of shipping purchases to the consumer. Other online retailers have optimized their logistics to reduce the time between an order being placed by a consumer and the delivery of the order to the consumer. Traditional brick-and-mortar retailers have also embraced this shift in consumer demand and introduced online storefronts, along with incentives encouraging consumers to make purchases online. Accordingly, an increasing number of packages of various, but in many cases increasing, sizes are being shipped to consumers and multiple packages are being received by a resident in a single day. In addition, some brick-and-mortar retailers are providing locker systems at or near their storefronts to allow consumers to pick up purchases for which they have paid on-line so as not to wait in checkout lines. Efficient use of this floor space in the store is important to the retailer.

Many of the consumers embracing online shopping reside in multiple household properties. These can include persons of a younger demographic living in student housing and apartment complexes, but also increasingly those of an older demographic residing in condominiums and even retirement complexes. These residents are often times not available during the day when packages are delivered. In some multiple household properties, the shipper simply places the package in a designated location, which can optionally be secured. This presents the possibility of the packages being stolen before the resident can retrieve the package. Although some multiple household properties have a front desk or reception area that is staffed, receiving shipments on behalf of the residents distracts the staff from their other duties.

Shippers and multiple household properties have initially developed solutions that allow a shipper to securely deposit a package or other item for a resident. The resident can later, retrieve the package using an identifier. Such a solution helps reduce losses for the shipper, helps reduce the workload of the staff at the property, and provides an amenity for residents who will know their packages are secure even when they are not at their residence to receive the packages. However, the current solutions generally are provided with a fixed array of sizes of lockers, and it is very cumbersome to change the mix of sizes of lockers once the lockers are installed. Often certain sized lockers are not used on a regular basis whereas there is not enough of other sized lockers leading to inefficiencies. In addition, locker doors can be damaged in use, and it would be advantageous to be able to easily change damaged locker doors in the field. Moreover, it would be advantageous to change the locker size mix at the convenience of the operator.

The system described here helps address these and other problems and provides a field configurable locker system and system for determining the proper mix of lockers and adjusting the mix of sizes of lockers in an array based on use data.

SUMMARY OF THE DISCLOSURE

A system for securely delivering packages of at least two different sizes by a sender to a receiver is disclosed comprising; installing an array of lockers of at least two different sizes with the number of lockers of each size based on a predetermined installed ratio, each locker having an interior space defined by a top wall and a bottom wall fastened to side walls and an end wall and a door, a locking portion associated with each door for allowing the door to open when in the unlocked state and remain closed in the locked state, a central control unit for controlling the locking portions on the array of lockers comprising a data input portion for receiving information on the size of a package to be delivered and determining if there is a vacant locker in the array of appropriate size to accommodate the package, a locker assignment portion that instructs the locking portion of the determined vacant locker to switch to the unlocked state, whereupon the sender places the package in the determined locker and closes the door, a data collection unit adapted to collect data on the frequency of demand for lockers of each size over a predetermined period of time, a locker optimization unit adapted to use the data collected to recommend a ratio of lockers of each size to maximize usage of lockers of appropriate size in the array, wherein if the recommended ratio is different from the installed ratio, changing the sizes of selected lockers after installation of the array to better match the recommended ratio by replacing doors and moving and re-fastening top and bottom walls.

A column of lockers, each locker having a top wall, a bottom wall, a pair of side walls, a door, a hinge pivotally connecting the door to one side wall to allow the door to be in an open or closed condition, and a lock, each of the doors having an inwardly projecting lip along its top edge and bottom edge and a pair of hinge brackets, each hinge bracket removably attached to a respective lip, with the bracket being removable only when the door is in the open condition, each of the locker top walls and bottom walls having a projection that overlaps with a door lip when the door is in the closed condition, the hinge comprising a vertical pin extending through an aperture in each bracket, with the apertures located in a slot in each inwardly projecting lip. A door is removed by disengaging the hinge brackets from the door lips thus freeing the pins to slide along the slots in each lip.

Further and alternative aspects and features of the disclosed principles will be appreciated from the following detailed description and the accompanying drawings. As will be appreciated, the principles disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 11 is a front elevation view of one module with a control unit.

FIG. 12 is a cut away view of FIG. 11 taken along lines 12-12.

FIG. 13 is a detail view of a hinge as seen in FIG. 12.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice versa without limiting the scope of the disclosure to the exact number or type of such elements unless set forth explicitly in the appended claims. The terms configured and configuration may be used herein to refer to a specified arrangement, or a structural size and shape.

Figure 1:
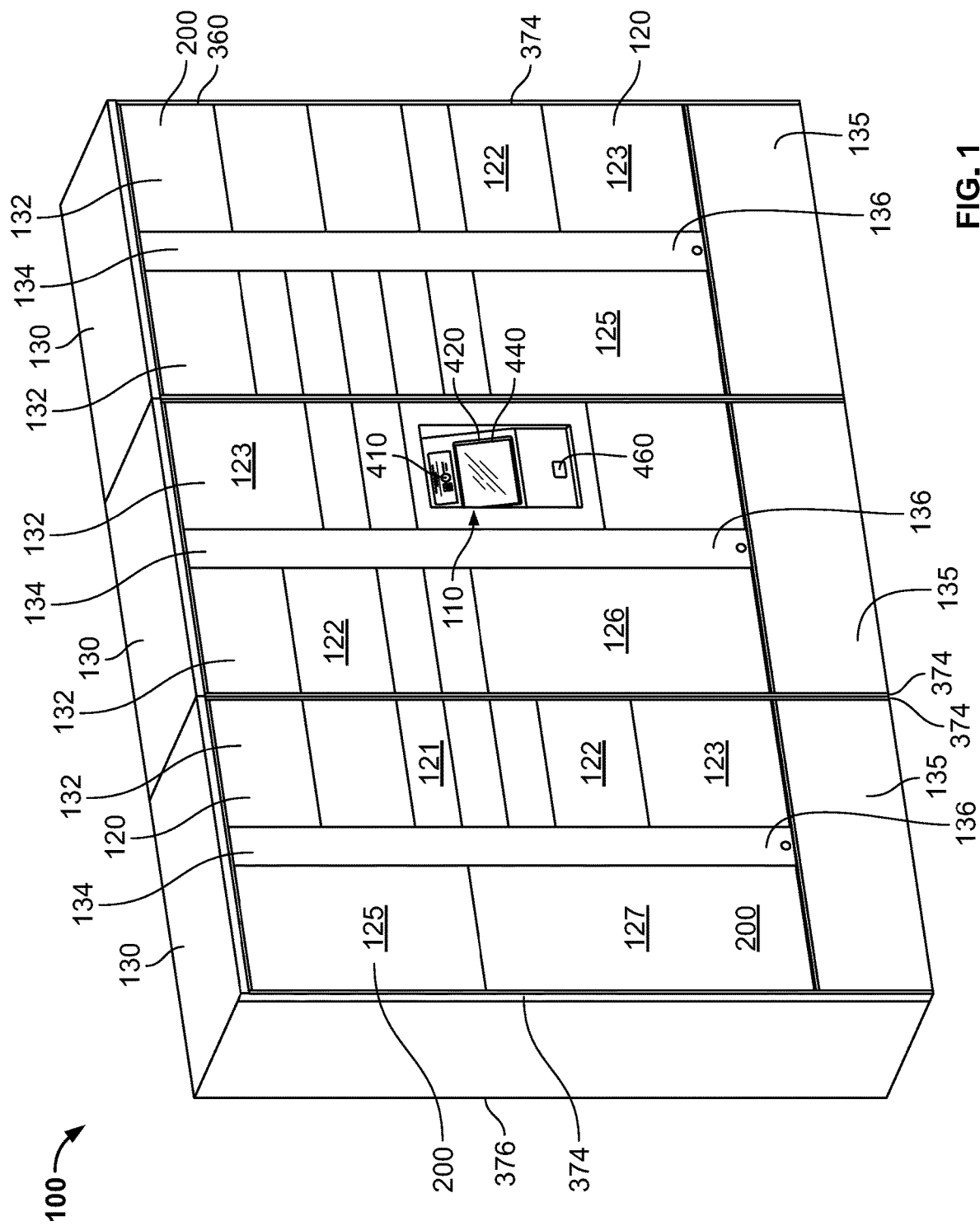
FIG. 1 is a perspective view of an installed embodiment of the package management system.

FIG. 1 illustrates one embodiment of the system 100 that allows for the system's user, or receiver, to securely receive items, often purchased online. Online shopping is fast changing from a curiosity for purchasing small or rare items to a default decision for mainstream consumers for purchasing many everyday items. With this increasing use of online shopping and resultant delivery of staples, there has been a tendency for the size of packages received to increase. Although the system 100 is described as a package management system in this specification, those of ordinary skill will recognize the benefits that will arise from employing this system in other areas beyond packages for residents. For example, tenants of coworking spaces can also benefit from this system. In addition, in a retail store, the retailer can place a locker system 100 at a convenient location for a consumer to pick up an item previously purchased on the internet so the consumer does not need to try to locate a store employee or go through a checkout line. Further, the items need not be packages deposited by a shipper and can include other items, small and large, such as letters, clothing that has been dry-cleaned, notices from property management, and food from food delivery services; just about anything that can be delivered or purchased.

Figure 2:
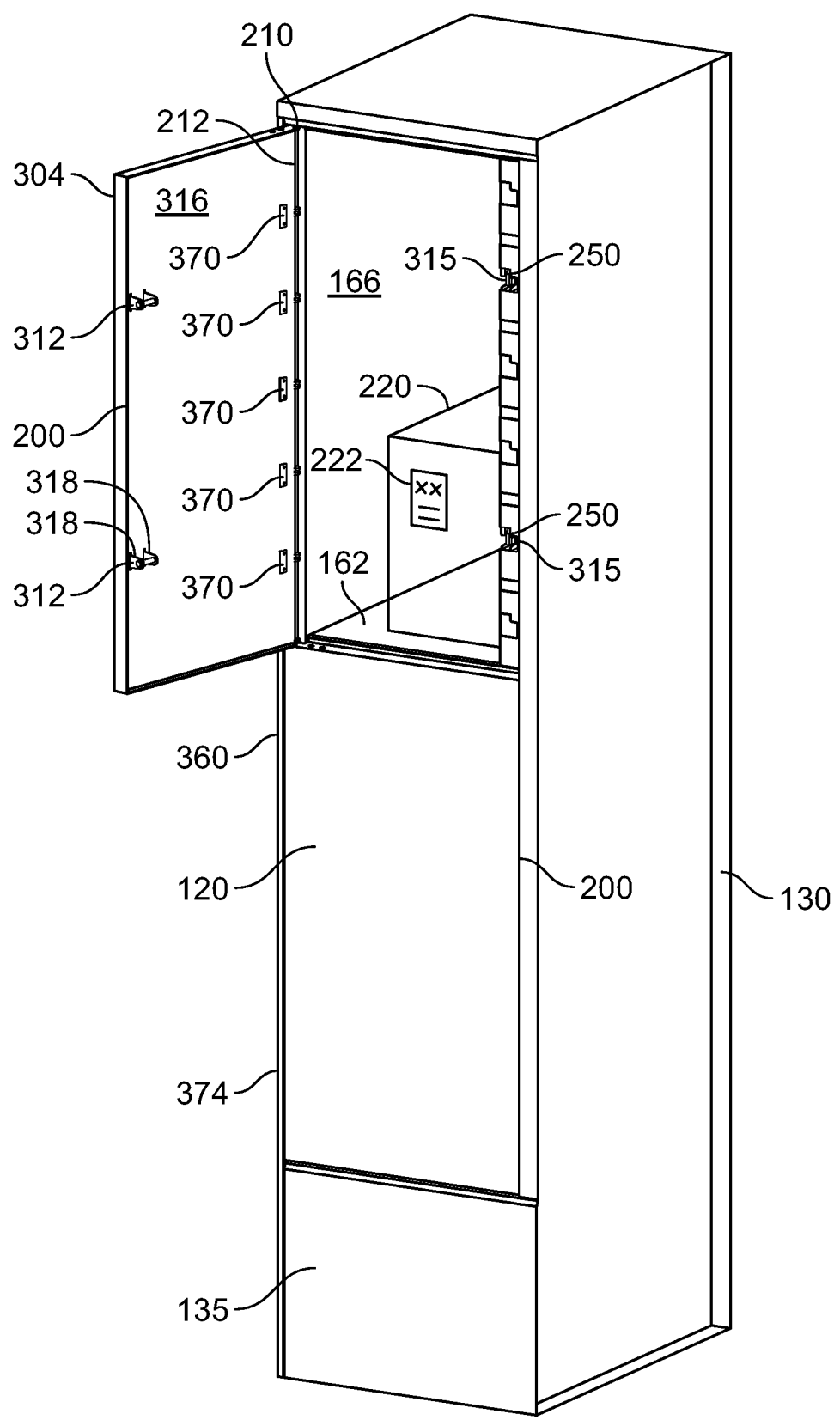
FIG. 2 is a perspective view of one embodiment of a storage locker module with one locker having a package inside, a hinged door and a locking portion.

The system includes a central control unit 110 and a plurality or array of storage lockers 120. In the embodiment shown in FIG. 1, the array of storage lockers 120 can be arranged in a set of three storage locker modules 130 with each module comprising two columns of lockers 120. Each column has vertical co-linear hinges 210 near the outside walls of the module and a number of locker doors 200 mounted on the co-linear hinges 210. Multiple storage locker modules 130 are arranged in an array with the central control unit 110 to form the package management or locker system 100. Multiple storage locker modules 130 can have storage lockers 120 of various sizes, as shown in FIGS. 1 and 2. The central control unit 110 controls each of the storage lockers 120 of the storage locker modules 130. The central control unit 110 can also receive information from each of the storage lockers 120. The central control unit 110 can directly control at least the locking portion for each of the storage lockers 120. Individual senders and receivers interact with the central control unit 110 of the system 100 to, for example, deposit and remove items.

Storage Lockers

Each of the storage lockers 120 is dimensioned to have an interior volume to be suitable for receiving and storing packages, letters, food, dry cleaning, purchased items and other items of various dimensions. FIG. 2 shows a locker 120 having a package 220 received in its interior space. The package has a package identifier or destination indicator 222 on one sidewall. Examples of package identifiers include printed names and addresses of recipients, bar codes and RFID tags.

Non-limiting examples of the dimensions of the storage lockers 120 include a height of approximately 5", 10", 15", 20", 25", 30", and 35", a depth of less than 24", and a width of less than 18". In one embodiment, the height of an individual locker is an integral size larger than the smallest size locker. For example, FIG. 1 shows lockers of the smallest size 121, double size 122, triple size 123, quadruple size (not shown), quintriple size 125, sextuple size 126 and septuple size 127. The predetermined installed dimensions of the storage lockers 120 can be derived using industry data regarding anticipated package size mixes. However, it can be appreciated that the most advantageous mix of locker sizes in any one location or array may vary depending on many factors, and often the effect of these factors on the frequency of receipt of different sized packages cannot be accurately predicted. Accordingly, it is desirable to be able to change the number of specific sizes of lockers in an array after installation based on various factors, such as observed data of use of each size locker in that array at that location.

In most situations, the most advantageous mix of sizes of lockers in an array is based on at least two current trends in the marketplace. First, the use of electronic lockers, especially in multiple resident locations, is steadily gaining acceptance. However, it has been shown to take some time for residents at a location with a new electronic locker array to fully utilize it, usually in the range of 3-6 months. Second, as noted above, consumers are embracing online shopping for more staple items. Both of these trends effect the optimal configuration of locker sizes at a particular location, and thus the optimal mix is difficult to predict prior to installation and initial usage trends. A data collection unit 710 (see FIG. 8) may be associated with the central control unit 110 or a central server 700 to provide information on the frequency of use of each size of locker as well as the amount of times a locker of a certain size may have been requested, but was not available in the current array.

Each storage locker 120 is made of durable materials such as high gauge steel and includes at least one door with a locking portion to help secure packages. FIG. 2 illustrates an example of the storage locker 120 with a hinged door 200 that is attached to the structure of the respective storage locker 120. In this embodiment, the hinged door 200 opens outwardly so that the interior can be accessed and items can be deposited and stored inside the storage locker 120. The hinged door 200 rotates about a hinge 210 with a hinge axis. The door may have an associated door position indicator 212 connected to the central control unit 110 to provide the central control unit 110 information on the state of the door as being open or closed. Each locker has a top wall or ceiling 160, a bottom wall or floor 162, a right side wall 164 a left side wall 166, a back wall 168 and a door 200. Except for the very top and bottom lockers, the ceiling 160 of a lower locker is one side of a sheet of material that is the floor 162 of the locker above.

Each storage locker 120 can include an individual communications connection and a power connection. These communications and power connections are adapted to connect to corresponding connections in the storage locker modules 130. Each storage locker 120 can further include processing hardware for controlling aspects of the storage locker and for processing information regarding the storage locker.

Storage Locker Locking Portion

FIG. 2 also illustrates the door 200 for each storage locker 120 is secured by at least one locking portion 250. The locking portion 250 secures the door 200 so that the items within the storage locker 120 are only accessible to authorized individuals. Some non-limiting examples of locking portions 250 can be latch-based locks, cam based locks, electromagnetic locks, solenoid-based locks, spring based locks, cylinder-type locks, timer-based locks, biometric locks, and other locks known in the art. In one embodiment, the locking portion is activated and locks the locker when the door is shut and unlocks the locker and biases the door open when a command is received from the central control unit 110. In another embodiment, the storage locker locking portion 250 is also configured to latch without locking so that the door 200 can be closed without changing the locking portion's lock state.

Each locking portion 250 receives commands from the central control unit 110. In response to the command transmitted by the central control unit 110, the locking portion 250 changes its state. For example, a locked locking portion 250 unlocks in response to the command from the central control unit 110. In one embodiment, when receiving a command from the central control unit to change state from the locked condition to the unlocked condition, the locking portion 250 also biases the door open and a door position indictor 210 transmits information to the central control unit that the door is open.

In some embodiments, the locking portion 250 can remain unlocked until it receives further commands from the central control unit 110. This is desirable to prevent premature locking of the storage locker 120. Some embodiments of the storage locker doors include locking portions 250 that automatically relock when the door is closed without additional commands from the central control unit 110. For example, the locking portion could be spring biased to the locked condition so that the storage locker is locked when an individual shuts the door 200 and a catch 312 on the door 200 interacts with a latch on the locking portion 250. This is optimal when it is desirable to secure the storage locker 120 immediately without requesting user confirmation. In one embodiment, the door position indicator 210 transmits information to the central control unit that the door is closed. Each locking portion 250 can transmit status information to the central control unit 110. Status information can include whether the locking portion 250 is locked or unlocked. Status information is obtained by sensors of the locking portion 250 and the door position indicator 210.

Some embodiments can include locking portions that can be manually overridden by authorized individuals. These types of manual action overrides are available even when the control unit 110 has not instructed the locking portion 250 to be unlocked.

Storage Locker Modules

Each storage locker module 130 can include identical storage lockers 120 or a variety of differently dimensioned storage lockers 120 to match initially expected package mixtures, also known as the predetermined installed mix of lockers. FIG. 1 illustrates non-limiting examples of three storage modules 130 with a variety of sizes of storage lockers 120. The storage locker module 130 with the plurality of storage lockers 120 and the hardware specific for the storage locker module 130 can be approximately 7' high. Other heights suitable for the installation location are contemplated and not specifically enumerated here. In some installations, a package management or locker system 100 can comprise numerous locker modules all connected to a single central control unit 110.

In one embodiment, as shown in FIG. 1, each module 130 comprises a pair of columns 132 of lockers. The columns 132 for each module have locker doors 200 that have outboard facing hinges 210 and inboard facing locking portions 250. The locking portions are on either side of a central space 134 for each module 130. By this construction, the doors 200 for lockers 120 on the right of the central space 134 open to the right and those to the left of the space 134 open to the left. The space is covered by a vertical wall or door 136 so that the front of the locker system 100 is relatively flat.

Figure 3:
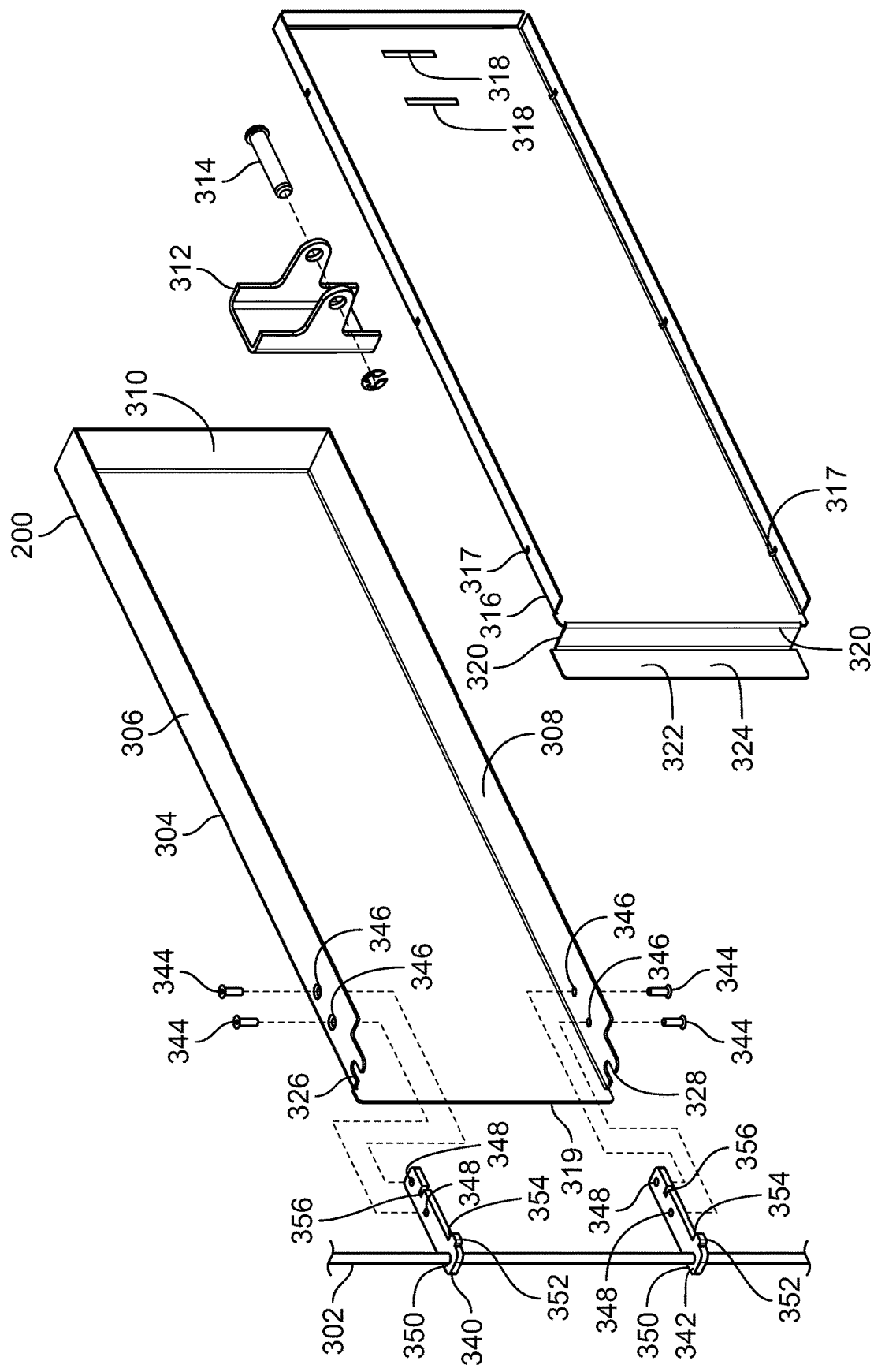
FIG. 3 is a rear perspective and exploded view of an example of a door having an optional double wall.
Figure 4:
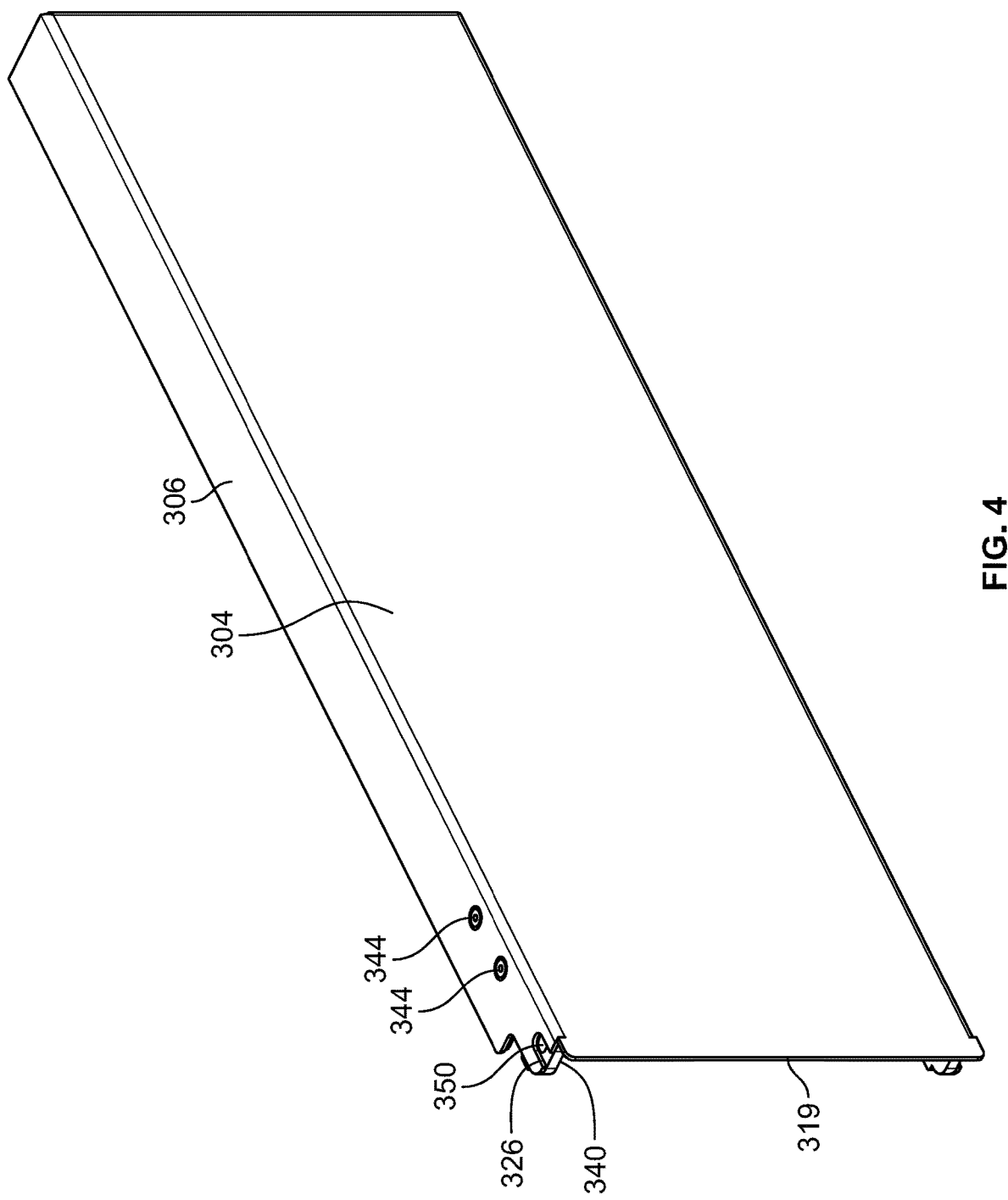
FIG. 4 is a front perspective view of an assembled door with an optional double wall.
Figure 5:
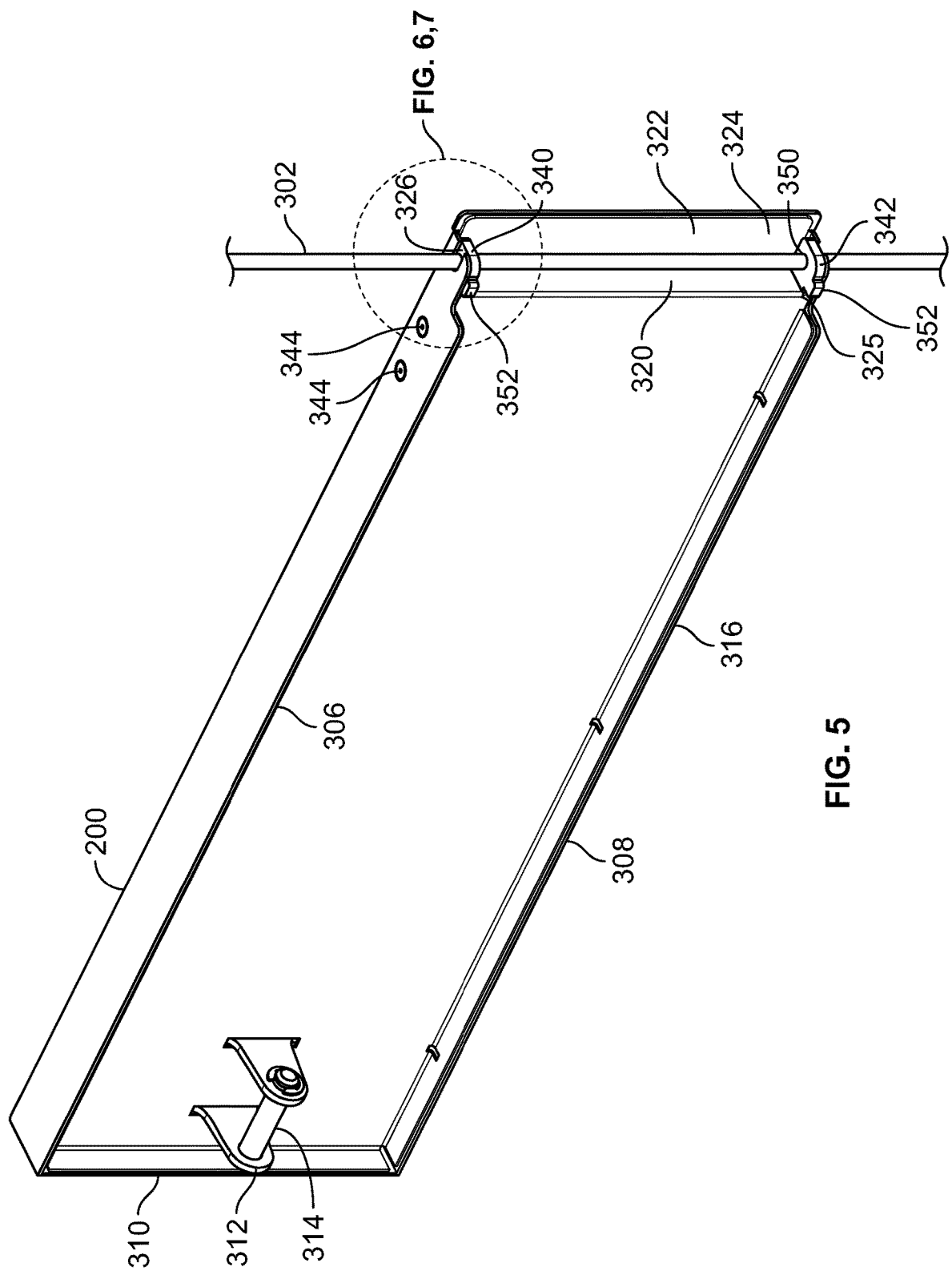
FIG. 5 is a rear perspective view of a door with a captive hinge pin.
Figure 9:
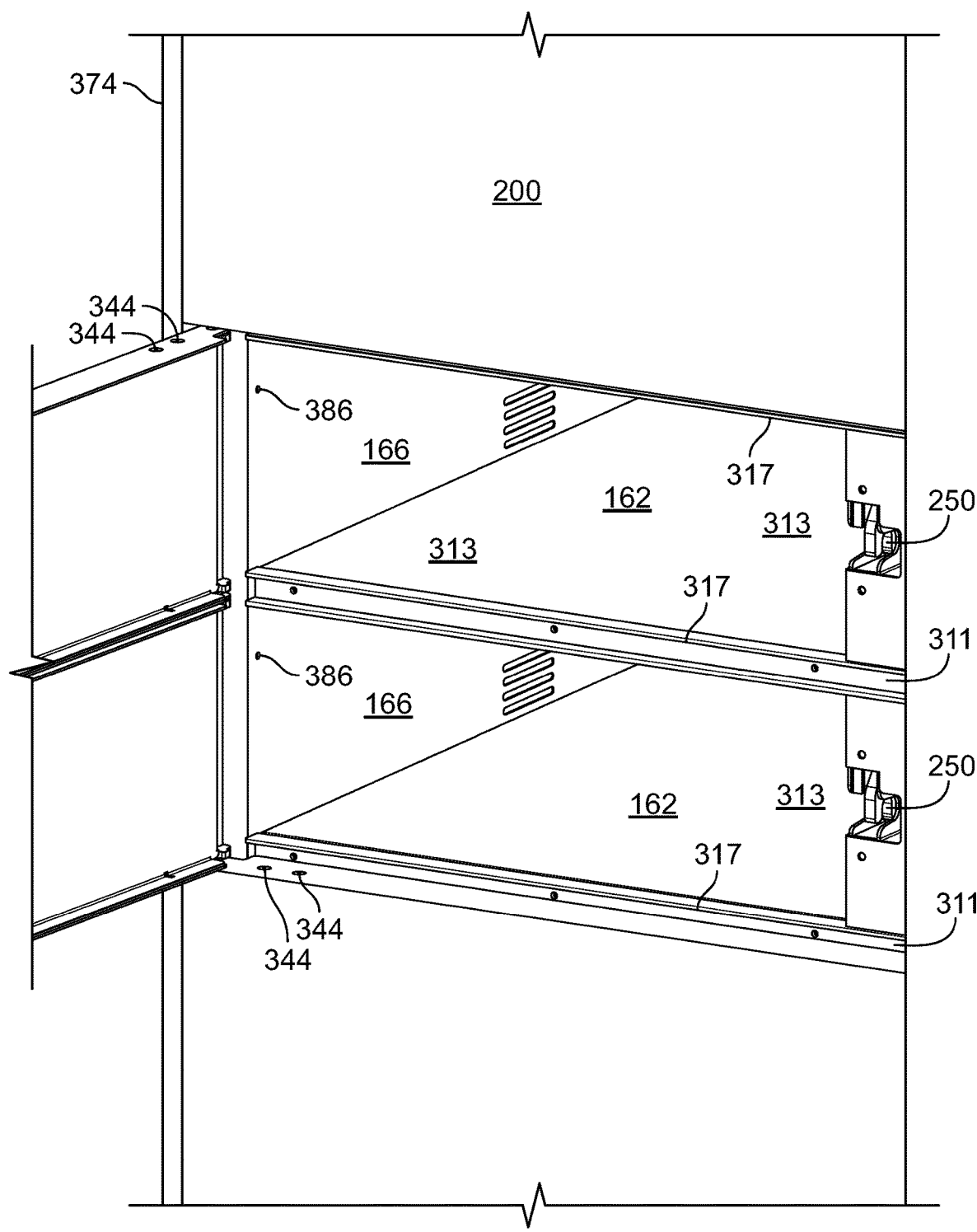
FIG. 9 is a partial perspective view of a column of lockers with two vertically adjacent lockers having open doors.
Figure 10:
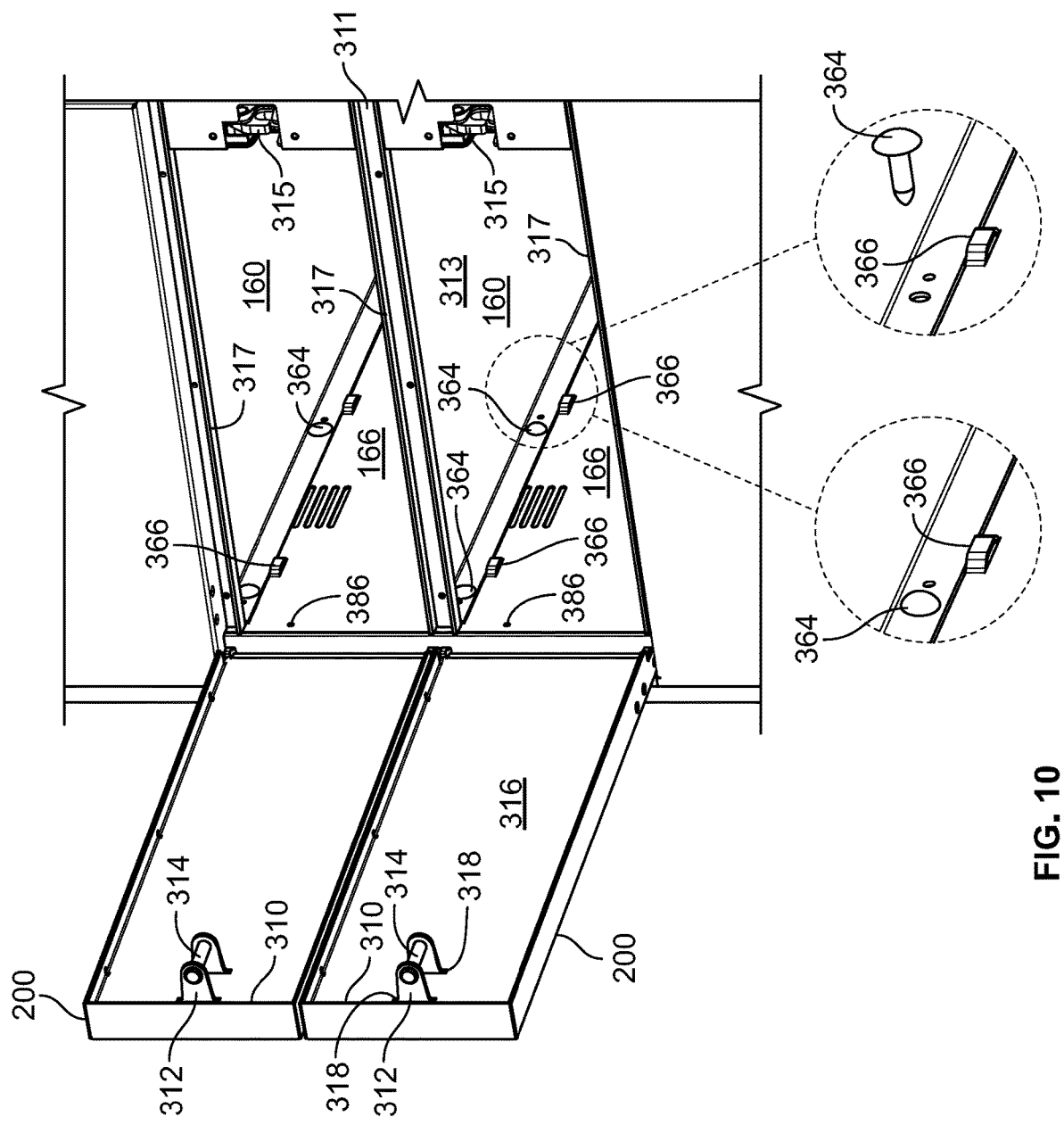
FIG. 10 is a partial perspective view of a column of lockers with two vertically adjacent lockers having open doors with accompanying details.

FIGS. 3 and 4 illustrate an example of a door construction 200 for a single size door. In FIG. 3, a pin 302 that runs the length of the column of lockers 132 that is part of the hinge 210 for hinging the door 200 to the module 130 is shown in exploded view so that the door will open to the right. FIG. 4 shows a similar door, but the door will open to the left. The door comprises a front wall 304 of sufficient size to close the locker. Extending from three sides of the front wall are top 306, bottom 308 and distal 310 rearward facing lips. The top 306 and bottom 308 lips are sized to fit into grooves 311 in the frame of the module (see FIG. 9) to ensure the locker is sealed when the door is closed. Each groove 311 is formed by a C shaped extrusion fastened to the front edge of the sheet of material 313 separating two lockers. The cooperation of the C shaped extrusion 317 causing the upper lip 306 and lower lip 308 to reside in the groove 311 when the door is closed restricts access to the fasteners 344 so the brackets 340 and 342 cannot be unfastened from the door. The distal lip 310 extends over an outer wall in the locking portion 250 to also secure the locker. The door also comprises a catch 312 including a catch pin 314 that cooperates with the latch 315 in the locking portion 250 to lock the door in the closed position.

FIG. 3 also shows an optional reinforcing wall 316 that is welded, glued or otherwise attached in spaced relation to the inside of the outer wall 304. The catch 312 and pin 314 extend through a pair of apertures 318 in the reinforcing wall when in position. The reinforcing wall 316 cooperates with the outer wall 304 to create a double wall construction that enhances the strength of the door 200 to increase the security of the locker. Weep holes 317 may be located along the top and bottom of the reinforcing wall. In a further embodiment, foam or other insulation can be placed in the space between the outer wall 304 and the reinforcing wall 316 to provide insulation to the space inside the locker. The proximal end of the reinforcing wall 316 comprises a shoulder wall 320 and an outwardly extending wall 322 that form a ledge 324. The length of the shoulder wall 320 is less than the distance between the inner walls of the upper 306 and lower 308 lips to create a space to allow for insertion of the hinge brackets or leaves 340 and 342.

The proximal end 319 of the outer wall 304 extends further than the upper 306 or lower 308 lips. The proximal end 319 of the outer wall 304 is also wider than the distance between the outer walls of the upper 306 and lower 308 lips. By this construction, the hinge pin 302 is substantially obscured from the outside of the unit by the proximal end 319 of the outer or front wall 304. A slot 326 is cut into the proximal end of the top lip 306 and a slot 328 is cut into the proximal end of the bottom lip 308. In a preferred embodiment, the slots have parallel sides along the longitudinal axis of the door. In another embodiment, the slots are L shaped with a major leg and extending along the longitudinal axis of the door inwardly from the end and a minor leg extending normal to the major leg toward the front of the door 200. With the slots 326 having the minor legs, the hinge pin 302 can be positioned in the minor legs so the walls of the minor legs contact the hinge pin 302 creating a strong secure hinge, not totally relying in the strength of the rivets 344 to maintain the integrity of the hinge.

Attached to the underside of the top lip 306 and top side of the bottom lip 308 are a pair of hinge brackets or leaves 340 and 342. In one embodiment, each bracket 340 and 342 is L-shaped and attached to its respective lip by a pair of fasteners 344 such as rivets that extend through apertures 346 in the lips and complementary apertures 348 in the brackets located in the stem of the L. Alternatively, one of each complementary pair of apertures 346 or 348 may be threaded and screws could be substituted for the rivets. In another embodiment, bolts and nuts could be substituted for the rivets. In the embodiments with the screws or bolts, special tightening driving surfaces may be employed to enhance the security of the system.

Figure 15:
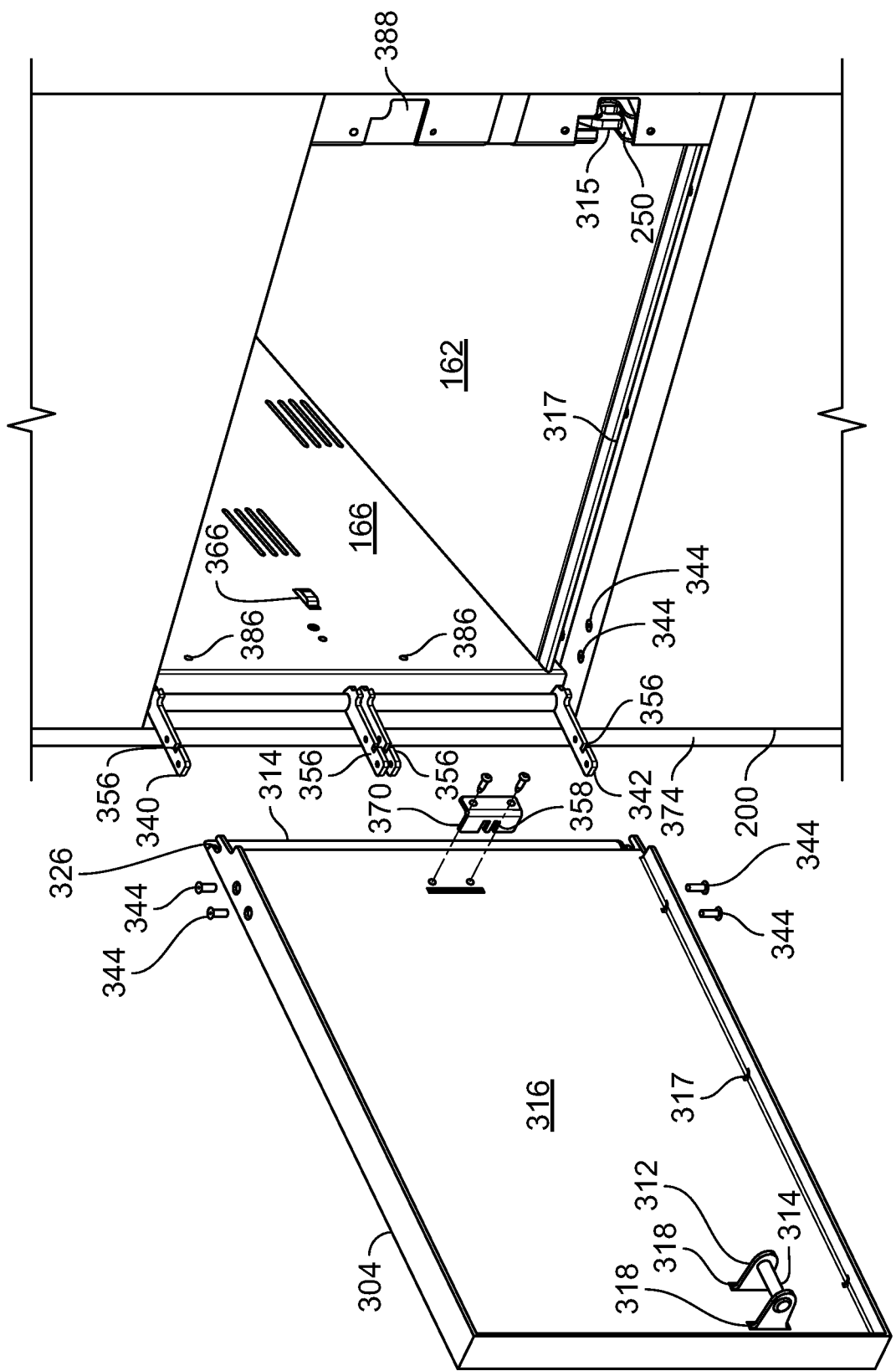
FIG. 15 is a perspective exploded view of a portion of a column of lockers in a second condition.

A protruding tab 352 extends from one side of each bracket 340 and 342. The backside 354 of the tab 352 butts up against the proximal end wall 320 of the inner wall 316 to locate the bracket 340 or 342 in the proper location so that the apertures 348 on the brackets align with the holes 346 on the upper 306 and lower 308 lips of the door to accept the fasteners 344. Each bracket also has a side notch 356. As seen in FIG. 15, the side notches 356 align with slots 358 on an intermediate door bracket 370 on doors for lockers that are more than a single height, such as lockers 122-127.

In one embodiment, each bracket 340 and 342 also has an aperture 350 through which the hinge pin 302 extends. As best seen in FIG. 13, the hinge pin 302 also extends through an aperture 372 in an extrusion 374 preferably made from aluminum. The extrusion 374 runs the entire height of the locker module 130. Before the hinge pin 302 is inserted into the aperture 372, portions of the extrusion 374 are sliced through laterally around the aperture 372 so that one or two brackets 340 or 342 are inserted into the slices and are captured by the hinge pin 302 when it is inserted through the length of the extrusion 374. In a preferred embodiment, each column of lockers has the potential of twelve single high doors, and thus 24 brackets 340 and 342 are placed along the extrusion 374 and hinge pin 302 for attachment of doors 200.

As seen in FIG. 13, the extrusion 374 also has an outer side wall 380 that is co-planar with the outer wall 376 of the module 130. The outer wall 376 of the module 130 also has a step 382 that cooperates with a pair of extensions 384 in the extrusion 374 so the outer wall is attached to the extrusion without the need of fasteners. The extrusion 374 is attached to the inner wall 378 by fasteners such as rivets 386. The extrusion also has a pair of longitudinal fastener acceptance grooves 386 that will accept fasteners for attaching the module upper and lower walls at the extrusion's upper and lower ends.

Figure 14:
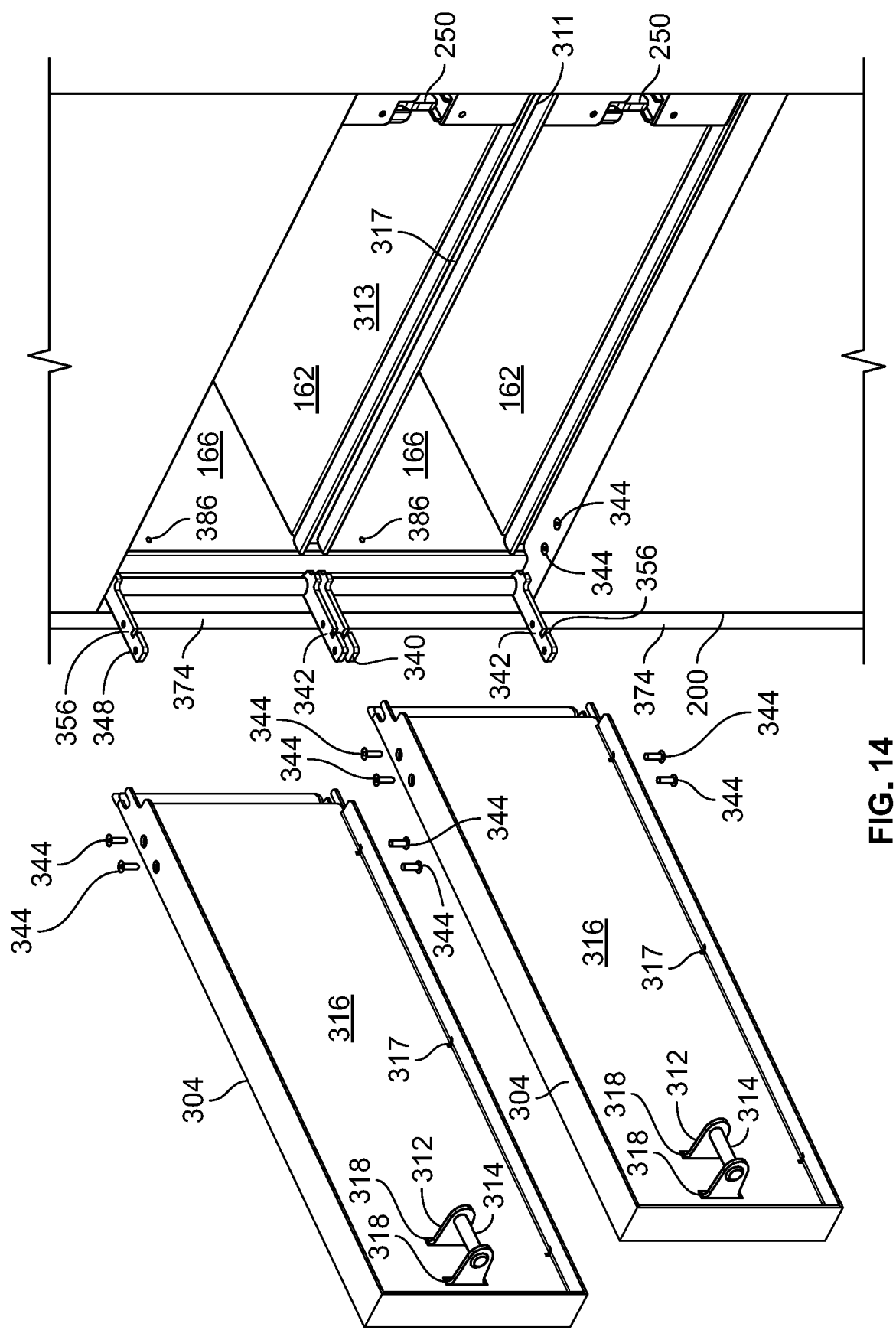
FIG. 14 is a perspective exploded view of a portion of a column of lockers in a first condition.

In the field, it may be desirable to change from two single lockers 121 to one double high locker 122. As seen in FIGS. 14 and 15, two single high doors may be removed and replaced by a double high door. First, the single lockers are opened and the fasteners 344, such as rivets or screws are removed. The doors can then slide off of the brackets 340 and 342. As seen in FIG. 15, the double high door can be installed by sliding the top bracket 340 and bottom bracket 342 into the door and fastening the door to the bracket with rivets 344. The brackets 340 and 342 in the intermediate portion of the door are inserted into apertures (not shown) in the proximal end wall 320 of the inner door 316. The intermediate brackets are held in place by the intermediate door bracket 370. In this embodiment all brackets along the length of the extrusion 374 are used to give the doors strength along the hinge side, even in the larger size lockers, such as that shown in FIG. 2.

Figure 6:
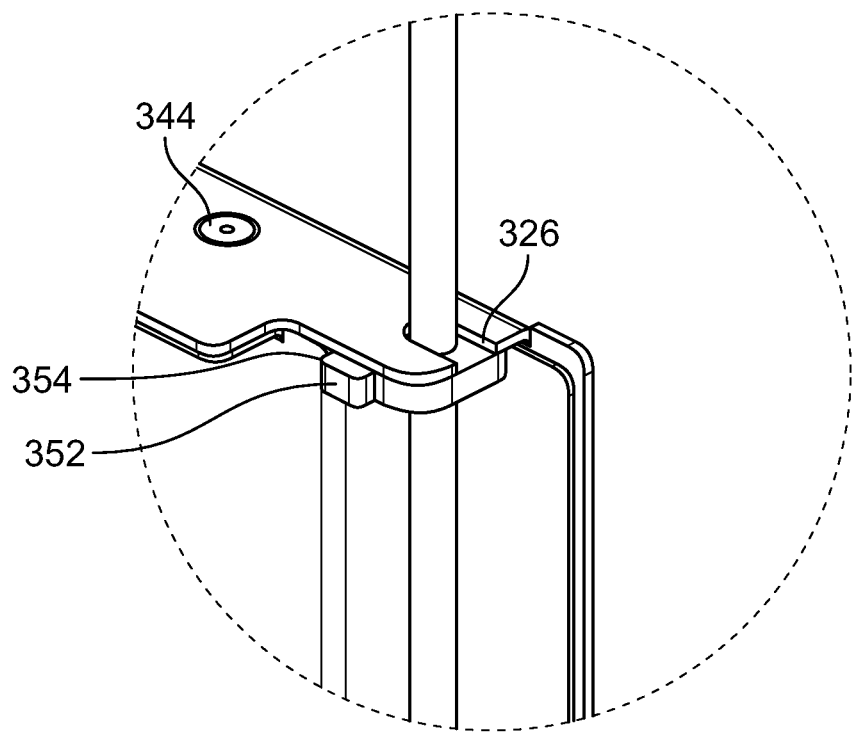
FIG. 6 is a detailed view of the door and hinge pin in the operating condition.
Figure 7:
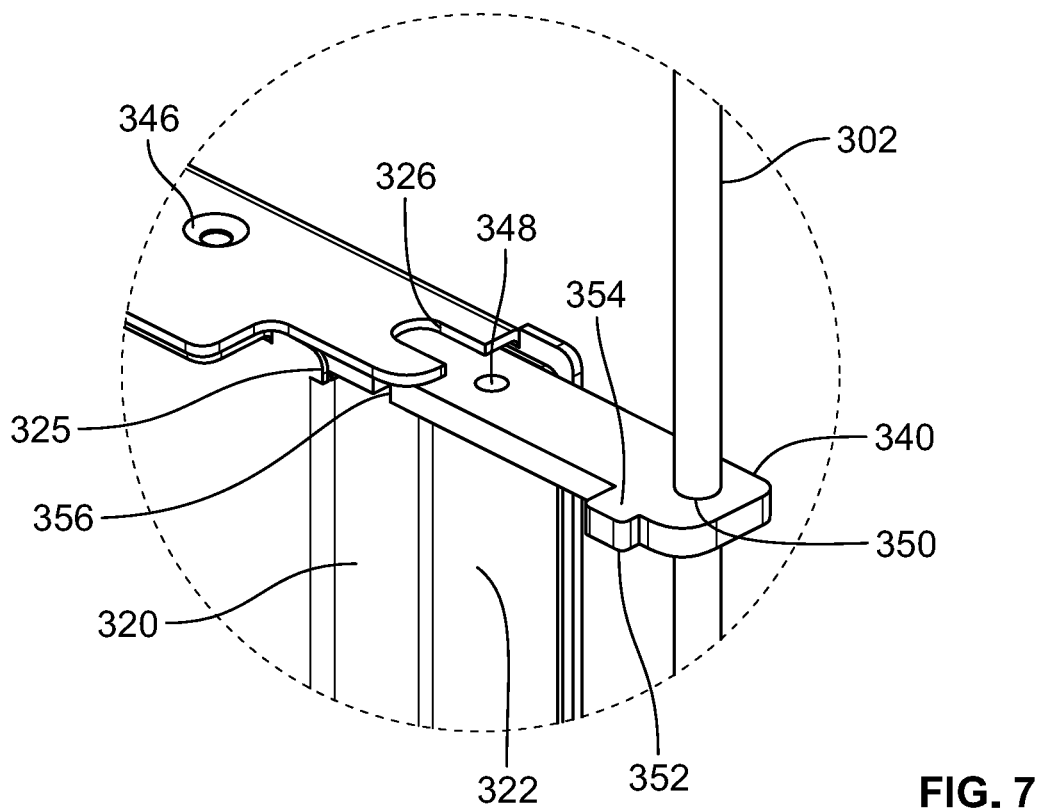
FIG. 7 is a detailed view of the door and hinge pin in the door removal condition.

In alternative embodiments, the aperture 350 may be replaced by a slot in the bracket, or the junction of the stem of the L with the underside of one of the sides of the top of the L, or a notch in the underside of one leg of the top of the L to allow the bracket to be removed from the hinge pin 302 when the bracket is not attached to the door. As can best be seen in FIGS. 6 and 7, when the brackets are attached to the lips, the door can pivot around the hinge pin. The door can be removed from the system by drilling out the rivets while the door is in the open position, and sliding the door off the brackets. However, as can be appreciated in viewing FIG. 9, when the door is in the closed condition, the rivets 344 are nested in the groove of the frame 311 and relatively inaccessible.

By this construction, the door 200 of each locker is easily removable and replaceable. As noted above, if it is discovered through analysis of use of the lockers at a specific location that there are too many single size 121 lockers and not enough double size 122 lockers, two vertically adjacent single size locker doors 200 can be removed and a single double size locker door replace them. One of the lock portions 250 can be deactivated or both lock portions 250 synchronized and a double size locker placed into service in the central control unit 110. Alternatively, one of the lock portions 250 can be removed and a cover plate 388 installed, as shown in FIG. 15. Or, for example, as shown in FIG. 2, in larger sized lockers, two lock portions 250 can be activated and four deactivated. The horizontal wall 313 and structure that creates the groove 311 between the two lockers can be removed by extracting the horizontal wall or shelf fasteners 364 such as plastic rivets passing through aligned apertures in depending lips of the shelf 313 and side and rear walls to create a double size locker. In a preferred embodiment, the fasteners can be simple plastic push rivets since the weight of the shelf 313 and the load on top of the shelf are taken by the bridge forms 366 that are punched into the side and rear walls. The opposite is also true; two single size lockers can be easily created from a double size locker by fastening a horizontal wall 313 to the sidewalls and end wall along with structure for the front groove 311 and attaching appropriate sized doors and locks. Some of the hardware specific to the storage locker module 130 includes equipment to manually disengage all of the locking portions 250 for all of the storage lockers 120 in the storage locker module 130 simultaneously and/or individually. Such equipment, when included, is preferably placed behind a secured bottom panel or door 135 or central panel or door 136 so that access is only given to authorized individuals such as property managers or law enforcement. Such secured panels 136 and 135 also prevent tampering. Other hardware specific to the storage locker module 130 can include power and communications aggregators to help reduce the number of connections between the storage lockers 120 and the central control unit 110.

Each storage locker module 130 can be connected to at least one control unit 110. In some embodiments, the central control unit 110 controls aspects of the storage locker module 130 and receives information regarding the storage locker module 130. For example, the central control unit 110 can control the storage locker module 130 and unlock all of the storage lockers 120 simultaneously, and the central control unit 110 can receive information regarding whether the secured panel or door 135 or 136 is open or has been tampered with. Other types of control commands and information are contemplated and not specifically enumerated here.

Each of the storage lockers 120 in the storage locker module 130 continues to be independently controlled by the central control unit 110, but can aggregate their communications with other storage lockers 120 in the storage locker module 130 so that the number of connections to the central control unit 110 is reduced. Where necessary, each storage locker module 130 will include additional hardware to facilitate this aggregation.

Central Control Unit

Figure 8:
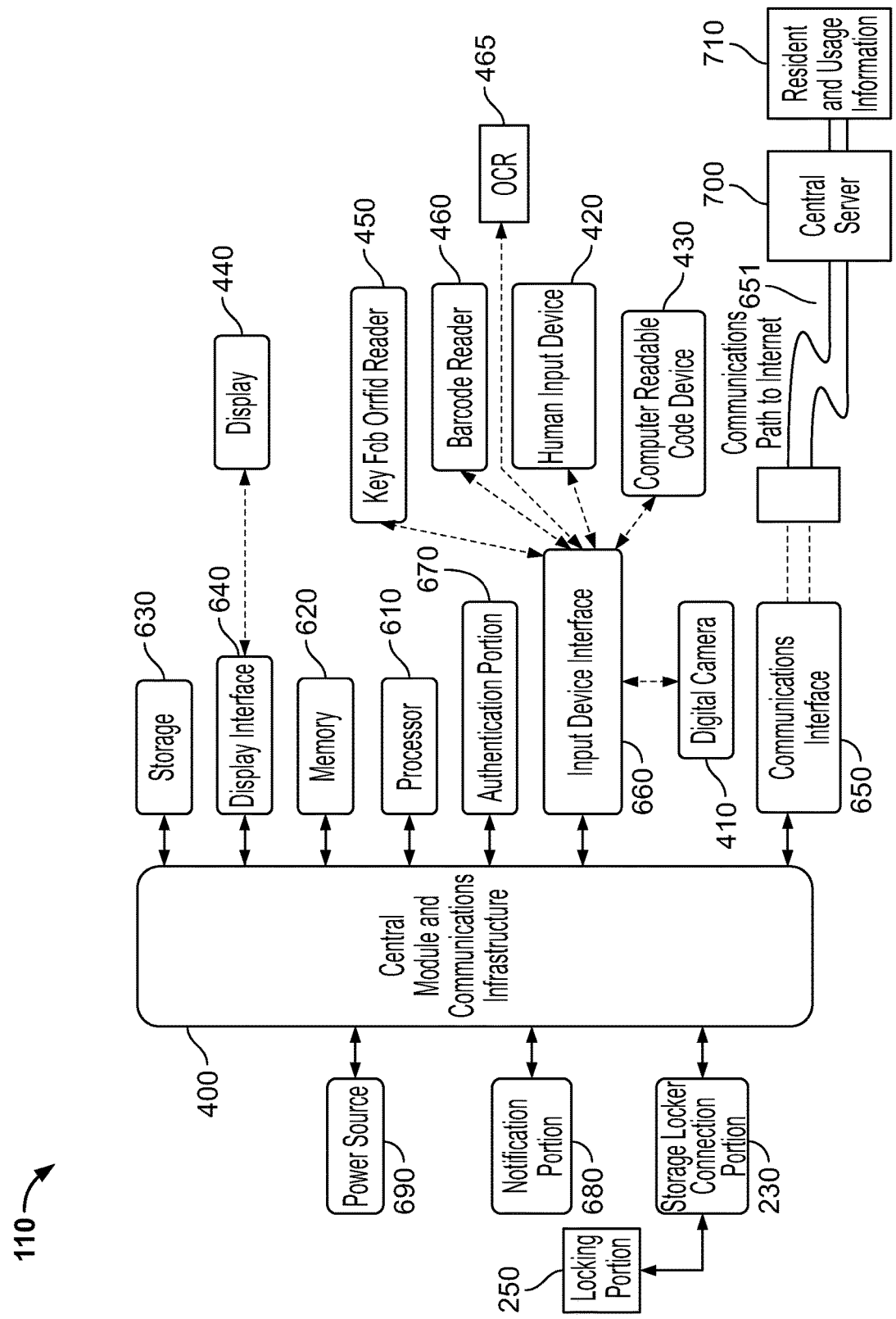
FIG. 8 illustrates an example of a central control unit with a control module.

FIG. 8 illustrates the central control unit 110 and a non-limiting example of the components in a central control unit 110. The central control unit 110 uses a variety of components to control each of the locking portions 250 of the storage lockers 120. The central control unit 110 can include storage lockers 120 in addition to the components described here so that the number of storage lockers 120 employed in the system 100 is maximized.

The central control unit 110 in FIG. 8 includes a control module 400 having input devices including at least a human input device 420 and a computer readable code device 430, processors 610, memory 620, storage 630, and a display device 440 connected to a display interface 640. The display device 440 can be a touchscreen and therefore operate as an input device. The central control unit 110 may also include a communications portion 650 for connecting to the Internet.

The central control unit 110 further includes a storage locker connection portion, which connects the central control unit 110 to at least one storage locker 120. In some embodiments, the connection from the central control unit 110 to the storage locker 120 can be aggregated through the storage locker module 130. Stated differently, the central control unit 110 can have a single connection to the storage locker module 130, which connects a plurality of storage lockers 120 to the central control unit 110 by way of the storage locker module 130. The different components of the central control unit 110 are connected to each other by way of well-known communications infrastructure 660. The central control unit 110 provides power and commands to each storage locker 120 and can receive information from each storage locker 120.

The control module 400 of the central control unit 110 shown in FIG. 8 includes a plurality of input devices 410, 420, 430 and can include, for example, a still camera 410, an optical character reader (OCR) 465 a barcode reader 460, and a key fob or RFID reader 450. Other embodiments of the central control unit 110 include biometric sensors, audio sensors, other RFID sensors, proximity sensors, Bluetooth proximity sensors, near-field communication sensors, and other types of information collecting devices as input devices. Any number of input devices can be employed in a central control unit 110. The central control unit 110 uses these sensors in a variety of ways to collect the desired information from a user, from packages, and from the environment and considers this information when making decisions. For example, it can act as an authenticator to verify the status of a delivery person. Input from the door position sensor 212 provides the central control unit 120 information on the state of the door for each locker 120. In addition, the central control unit 110 can use this information to control each of the locking portions 250 of the storage lockers 120 in the package management system 100. The central control unit 110 can, in some embodiments, use aspects of the individual storage lockers 120 when controlling each of the locking portions 250. For example, the central control unit 110 can consider if the locking portion 250 or the door position indicator 210 through a storage locker connection portion 230 is providing status information that indicates the locking portion 250 is unlocked or the door is open before transmitting commands. In a preferred embodiment, as shown in FIGS. 1 and 11, the control unit comprises, among other things, a camera 410, a display 440 that can also function as a human input device 420 and a barcode reader 460.

The central control unit 110 executes locker control software and provides a user interface on the display device 440 by controlling the display interface 640. The display interface 640 can also function as an input portion when the display device 440 is a touchscreen device. For example, the display device 440 or the input device 420 may include a list of approximate sizes of packages that can be accommodated by the array of lockers. The delivery person can choose from the list and input the size that best matches the size of the package to be delivered. The central control unit can then identify an appropriately sized locker to match or slightly exceed the size of the package. It can be appreciated that the maximum use of the space allotted to the locker system 100 can only be achieved when the proper sized lockers are used with maximum frequency for each sized package.

When referring to the central control unit 110, aspects can be executed by hardware components purposely built for executing these aspects, and other aspects can be executed by software components of the locker control software being executed on hardware components that perform multiple aspects. The user interface provides information to the user and requests input from the user through the input devices. The central control unit 110 can also provide audile feedback in response to input.

Information collected by sensors of the individual storage lockers 120 is transmitted to the central control unit 110 for consideration by the locker control software. In some embodiments, the sensor information is preprocessed by an aspect of the storage locker 120 so that status information is transmitted to the central control unit 110. In some embodiments, other types of information can be considered by the central control unit 110 including information received from external sources over the Internet, and information received from authorized devices wirelessly connected to the central control unit 110. The central control unit 110 can, for example, wirelessly communicate with a device in a user's possession for authentication. The central control unit 110 uses the different information from the sensors to determine if an action is necessary. An action can include unlocking a locked storage locker 120, locking an unlocked storage locker 120, transmitting an notification, authenticating a user, responding to user input, scanning a package, updating the status of a storage locker 120, aggregating and remembering use of specific locker sizes overtime, and other tasks needed to respond to sensor inputs as desired. When aggregating and storing use of locker sizes, a data collection unit can be associated with, for example, either the storage unit 630 of the central server 700. Algorithms in a locker optimization unit can use the data to provide a recommended new ratio for optimal locker array usage to the operator who can then initiate the field locker configuration routine or process 500.

The resident information stored in the storage portion 630 or a central server 700, can be used to match a package being delivered to a particular resident. The resident information stored in the storage portion 630 can also be used to authenticate a user so that at least one storage locker 120 containing the corresponding packages is unlocked so that the user can retrieve the packages. For example, when a service provider or sender arrives to deposit a package, the service provider will match the package to a resident. In one embodiment, the service provider can scan package information to match the package to a receiver or resident, or the service provider can search for the resident in the resident information stored in the storage portion 630 or central server 700. Further, when a resident arrives, the resident can present information for authentication through an input device. The resident information stored in the storage portion 630 or central server 700 is then used to determine if the information for authentication constitutes valid authentication information.

The storage portion 630 or central server 700 can also be used to store data concerning the frequency of demand for certain size lockers based on the input on package size from the sender or service provider. After a period of time, generally 3-6 months, this data can be queried and used by the property management to adjust the number of lockers of each size in the array to better match demand and thus make more efficient use of the system. This data may also include instances when the appropriate size locker is not available for the package identified and a larger size locker than optimal is opened by the central control unit 110 or a default message is sent via the display 440 to the sender that no lockers are available and the sender must make alternative arrangements to deliver the package.

The central control unit 110 uses industry standard techniques to connect to the Internet and the central server 700. The central control unit 110 can use either wired or wireless networking technologies to establish the connection to the Internet. The central control unit 110 can operate by being directly connected to the Internet or by being connected to the Internet by way of a firewall.

Some embodiments of the central control unit 110 include a notification portion 680 for transmitting notifications to users. The notification portion 680 can use the connection 651 to the Internet when the type of notification transmitted is facilitated by using the Internet. The notification portion 680 can use other communications networks to transmit the notification. For example, the notification portion 680 can rely on a cellular network connection to transmit an SMS message to the user. The notification portion 680 can rely on other communications techniques using other communications networks such as Wireless Ethernet, ZigBee™, Bluetooth, and similar networks configured for a specific device or application. For example, the central control unit 110 can detect a particular smartphone within proximity of the notification portion 680, and then use the notification portion 680 to transmit to a smartphone when the smartphone is within range of the notification portion 680 to remind the user of the smartphone that a package is available. The notification portion 680 either can directly transmit the notification to the smartphone using a communications network, or the notification portion 680 can use the connection to the Internet to transmit a notification to the smartphone.

Some embodiments of the central control unit 110, possibly through a central server 700, can also track the amount of time a package is stored in a storage locker 120. This is particularly applicable in situations where the package management system 100 is used in a location where the storage lockers 120 are provided as part of a service. For example, in a co-working environment, the property owner can charge tenants for the period of time a package is stored in the storage locker 120. The amount of time a package is stored in a storage locker 120 can also be used to determine if the package time has expired. This occurs when a package has been stored in the storage locker 120 for a period of time that exceeds a predetermined period set by the property owner. The property owner can then remove the time expired package from the package management system so that the storage locker 120 is again available for others to use. This data can also be stored in the storage portion 630 or central server 700 and used with other data to enhance the efficiency of use of the system 100.

Figure 16:
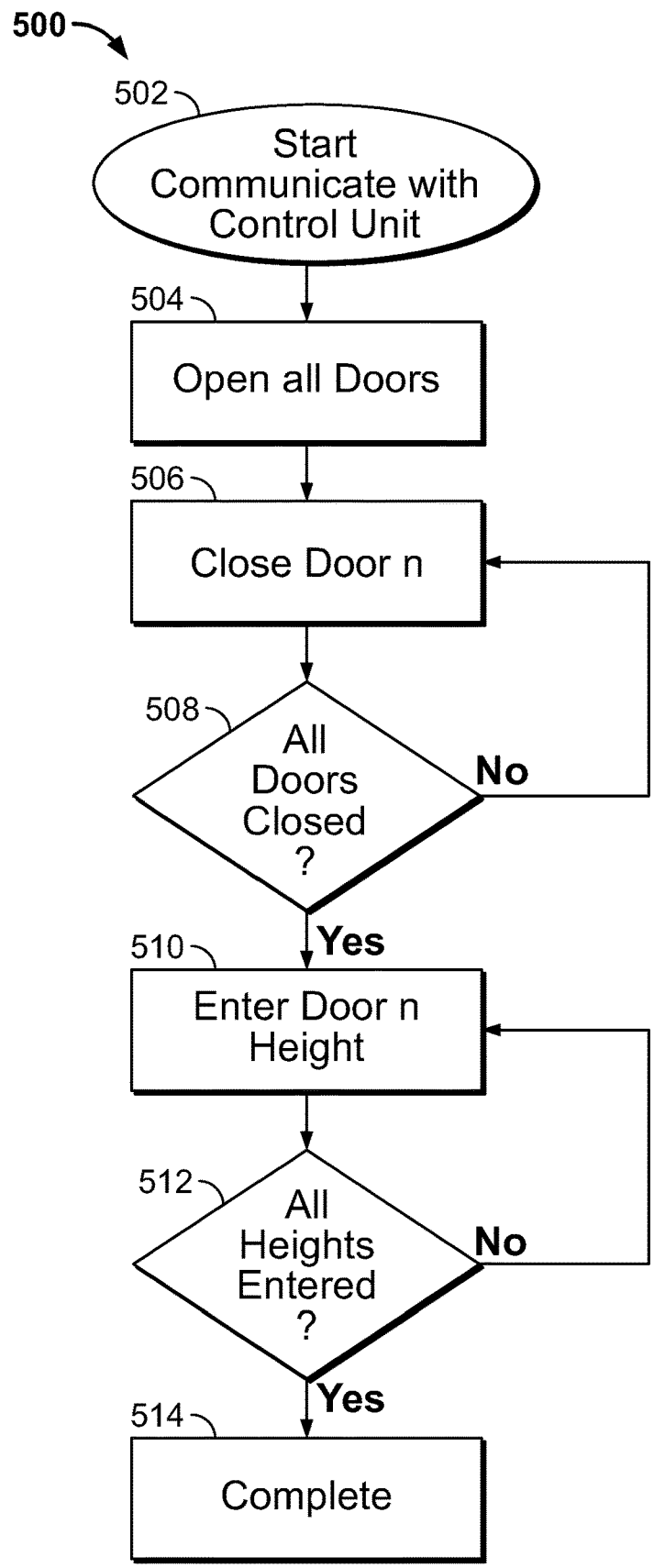
FIG. 16 is a flow chart of steps for teaching the control unit a new configuration of lockers.

When changing the sizes of the array of lockers in the field, the control unit 110 must be instructed as to the recommended new array of locker sizes and positions. The recommended new array is generated from a locker optimization unit that receives data from a data collection unit as described earlier. This field locker reconfiguration routine or process 500 is outlined in FIG. 16 and must be performed by authorized personnel initially selecting a locker changing routine and communicating that 502 to the control unit 110. If the control unit is operating more than one module 130, a specific module is selected. In a preferred embodiment, in any one module there are two columns of lockers with a possible maximum of 12 single high lockers 121 in each column, or a possible maximum of 24 lockers and 24 lock portions per module 130.

Once the locker size change routine 500 is selected, the control unit 110 opens all doors 504 in the module 130. In one embodiment, the control unit cancels all transactions in the module, and if there are packages in any locker, the packages should be removed and the recipients notified. The operator then physically reconfigures the doors 200, shelves 313 and lock portions 250 to the new preferred configuration in the field as described earlier.

Once the module 130 is configured in the new array of lockers, and especially the new array of active lock portions 250, the operator closes each door of lockers 1-n in succession 506, starting with the upper left door, going down the left hand column and then closing the doors in the right hand column from top to bottom. The control unit recognizes which of the 24 possible lock portions 250 are activated. In a preferred embodiment, once all doors have been closed, the operator advises 508 the control unit 110 of that fact.

At this point, the control unit must be advised of the size of each locker. In the same order in which the lockers were closed, the control unit asks the operator to enter the locker size or door height 510. As noted above, in any one column the locker doors can vary from twelve single high doors needing twelve lock portions to a single door that is twelve high that may, for example, use three lock portions 250. Accordingly, in one embodiment, the control unit will provide for integers from 1 to 12 to be selected for each of the locker doors that were closed. Throughout this process, the control unit will disable illogical size options based on the configuration so far in the process, considering things like total lock portions 250 remaining (that have to be assigned to doors) or the positioning of the door in the 12-high column of the module. In one embodiment, once the penultimate locker door height is selected, the control unit 110 understands the ultimate locker height must equal the remaining height, and it removes the ability to select other sizes so the field technician has only two choices; select the only size left, or recognize they made a mistake and select the back button to undo steps until they can correct their error. Once all locker sizes or heights has been assigned, the routine is completed 514. At this point, an optional locker size or height checking routine may be run to verify that the control unit 110 does in fact know the proper size and location of each locker in the module 130.

Property Management Interface

Some embodiments allow authorized property management representatives to query the central control unit 110 or central server 700 for reports on the residents, the billing of residents, and the usage of the package management system 100 at a property, for instance, information concerning the frequency of use of various sizes of lockers through a property management system 710. The reports can be generated in a variety of standard formats including comma separated values or tab-delimited values so that the information can be further processed. The reports can also be retrieved in a variety of standard document types including Excel spreadsheets, Word documents, or Portable Document Formats, among others.

Usage reports can include reports identifying the availability of storage lockers 120 of specific sizes in the package management system 100, the packages currently being stored in the package management system 100, including the length of residence time for each package, errors or faults in the package management system 100, the activities of the storage lockers 120 of the package management system 100, and any overrides of the storage lockers 120 in the package management system 100.

Usage of the Package Management System

Operation of one embodiment of the package management system 100 is now presented. In one embodiment, a resident orders a package to be delivered to their residence. A shipping carrier delivers the package to the locker. When a service provider arrives at the package management system 100, the service provider authenticates with the central control unit 110. The service provider can present a badge, FOB, or other identifier for the input devices (420, 430) to scan. The central control unit 110 considers the identifier presented by the service provider and the authentication portion 670 decides if the identifier is valid authentication information for a service provider.

When the service provider has been authenticated, the service provider can scan a package identifier or destination indicator 222, or search for resident information corresponding to the resident if no package identifier 222 is available. In one embodiment, when a package identifier is scanned, the central control unit 110 can determine from the package identifier 222 which resident is associated with the package. In some embodiments, the central control unit 110 can contact an external resource over the Internet in order to associate the package identifier 222 with a resident. In another embodiment, the resident information can be searched for by either incrementing through a list or other presentation of all the resident information, or the resident information can be searched for by typing a portion of the resident name and/or address information for the resident so that the correct resident is identified. If the package cannot be associated with a resident, the package can be restricted from being deposited with the package management system 100 notice is given to the service provider or he may log out.

Once the resident corresponding to the package has been identified, the service provider can be presented with a screen to determine what size locker will be provided for the package. The service provider selects the appropriate size, for example, size one through six. If an appropriate storage locker 120 is not available, the service provider selects an option indicating that the package will be deposited at another location such as an office or another designated area or he may log out. If an appropriate sized storage locker 120 corresponding to the selected size is available, the storage locker 120 is then unlocked by the central control unit 110 by changing the state of the locking portion 250 to unlocked. Data concerning the frequency of the desire to use that size locker is then stored either in the central control unit 110, the central server 700 or the property management system 710 for future use. The data can be collected to compare the actual use of each size locker over a period with the installed number of each size locker. The package management system 100 can then provide a report to the property manager with the usage statistics, or it can use internal or externally received logic to recommend a change in the number of certain sized lockers to better match the actual usage data. With the present locker system, changes in the size of lockers can be readily made in the field after installation of the system. Alternatively, data can be supplied to an architect designing a new multi-unit building to recommend a custom mix of sizes of lockers in the array based on various local parameters to allow the architect to most efficiently design the package management system.

The central control unit 110 determines which residents have received packages and the number of packages received by each resident, and prepares a series of notifications for transmission by the notification portion 680 to the resident that includes the number of packages received by the resident. The central control unit 110 retrieves the appropriate resident information. If no resident information is available, a default set of notifications can be used. The notification portion 680 then transmits the specified notifications to the resident so that the resident is informed that a package or packages have been received. An additional notification can be transmitted to, for example, the property manager, so that the property manager can also be aware that a package or packages have been deposited.

A resident arrives at the package management system 100 and presents identification information. For example, the resident can scan an identifier such as a barcode or a key fob, or the resident can use a physical keypad or a touchscreen keypad to enter an identifier. If the identifier corresponds to a resident, the central control unit 110 then presents an inquiry for the resident to enter further information to authenticate. In some embodiments, the inquiry requests the resident enter a user-specified identifier or unlock code to authenticate. In other embodiments, the inquiry requests the resident provide other information available to the actual resident to authenticate. If the individual authenticates, the central control unit 110 displays a message indicating the appropriate storage lockers 120 have been unlocked. The central control unit 110 also unlocks the locking portions 250 of the appropriate storage lockers 120. In some embodiments, the central control unit 110 can present a screen on the display 440 prompting the user to initiate the unlocking of the locking portions 250. Some embodiments can also allow the resident to configure a preference as to whether the storage lockers 120 are automatically unlocked after authentication or if the storage lockers 120 are unlocked after subsequent input after authentication.

Once the resident has removed the packages, the resident indicates that the process is complete and the user is logged out. The central control unit 110 then returns to a state awaiting further input from an individual.

Modifications

Although the above described package management system has been described, modifications to the system are contemplated by this disclosure. In some embodiments, a nearfield communications device, Bluetooth device, or other wireless device can be used in order to identify a particular user instead of an RFID tag or a key fob.

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system for securely delivering packages of at least two different sizes by a sender to a receiver comprising;
    installing an array of lockers of at least two different sizes with the number of lockers of each size based on a predetermined installed ratio, each locker having an interior space defined by a top wall and a bottom wall fastened to two side walls and an end wall and a door;
    a locking portion associated with each door for allowing the door to open when in the unlocked state and remain closed when in the locked state;
    a central control unit for controlling the locking portions on the array of lockers comprising a data input portion for receiving information on the size of a package to be delivered and determining if there is a vacant locker in the array of the appropriate size to accommodate the package, a locker assignment portion that instructs the locking portion of the determined vacant locker to switch to the unlocked state, whereupon the sender places the package in the determined locker and closes the door;
    a data collection unit adapted to collect data on the frequency of demand for lockers of each size;
    a locker optimization unit adapted to use the data collected to recommend a ratio of lockers of each size to maximize usage of lockers of appropriate size in the array;
    wherein if the recommended ratio is different from the installed ratio, changing the sizes of selected lockers after installation of the array to better match the recommended ratio by replacing doors and re-fastening top and bottom walls.

2. The system of claim 1 wherein if the central control unit determines there are no vacant lockers of sufficient size in the array, it sends a default message to the sender to find an alternative delivery method.

3. The system of claim 2 wherein the data collection unit also collects data relating to the lack of any vacant lockers of sufficient size.

4. The system of claim 3 wherein the optimization unit uses the data related to the use of specific sizes of lockers as well as the data related to the lack of lockers of specific sizes in making its recommendation for maximizing usage of the lockers in the array.

5. The system of claim 1 wherein there are four different sizes of lockers in the array with each size being integrally larger.

6. The system of claim 1 wherein the installed ratio is 6 lockers of size 1, 4 lockers of size 2, 3 lockers of size 3 and one locker of size 4.

7. The system of claim 1 also comprising a field locker reconfiguration routine for instructing the central control unit of the location and size of lockers in the new array.

8. The system of claim 7 wherein the field locker reconfiguration routine for instructing the central control unit of the location and size of the lockers in the new array comprises opening all locker doors in the original array of lockers, physically changing out the doors desired to be changed to establish the new array of locker sizes, closing all of the doors and advising the central control unit of the size of each new locker.

9. The system of claim 8 wherein the size if each new locker is determined by the height of each new locker door and the height of each new locker door is an integer between 1 and 12 inclusive.

10. A column of lockers, each locker having a top wall, a bottom wall, a pair of side walls, a door, a hinge pivotally connecting the door to one side wall to allow the door to be in an open or closed condition, and a lock,
    each of the doors having an inwardly projecting lip along its top edge and bottom edge and a pair of hinge brackets, each hinge bracket removably attached to a respective lip, with the removability of the attachment available only when the door is in the open condition,
    each of the locker top wall and bottom wall having a projection that overlaps with a respective door lip when the door is in the closed condition,
    the hinge comprising a vertical pin extending through an aperture in each hinge bracket, wherein a door is removed by opening the door, detaching the hinge brackets from the door lips and sliding the door away from the hinge brackets.

11. The column of lockers in claim 10 wherein each of the top and bottom lips also have a slot, and the hinge pin is nested in the slots.

12. The column of lockers in claim 10 wherein each door has an outer wall from which the lips extend and an inner wall co-planar and spaced from the door outer wall, said inner wall also having inwardly extending upper and lower lips contacting the upper and lower lips of the outer wall.

13. The column of lockers of claim 12 having insulation in the space between the inner and outer walls.

14. The column of lockers of claim 10 wherein the upper wall and lower wall of adjacent lockers is removed or installed to comport with the size of the new door.

15. The column of lockers of claim 10 also having a central control unit and wherein each lock has an open and closed state, and the central control unit changes the lock from the closed to the open state.

16. A column of lockers, each locker having a top wall, a bottom wall, a pair of side walls, a door, a hinge pivotally connecting the door to one side wall to allow the door to be in an open or closed condition, and a lock,
- each of the doors having an inwardly projecting lip along its top edge and bottom edge and a pair of hinge brackets, each hinge bracket removably fastened to a respective lip, with the removability of the door only available when the door is in the open condition,
- each of the locker top wall and bottom wall having a projection that overlaps with a respective door lip when the door is in the closed condition,
- the hinge comprising a vertical pin extending through an aperture in each bracket, with the apertures located in a slot in each inwardly projecting lip, wherein the door is removed by unfastening the brackets from the door lips while the door is in the open condition, freeing the hinge pin to slide along the slots in each lip.

* * * * *